June 25, 1968

H. J. BACH ET AL 3,390,118

RESINOUS COPOLYESTERS COMPRISING ALIPHATIC DIOL, POLYHYDRIC
ALCOHOL AND DICARBOXYLIC ACID DIIMIDE AND
COATING SOLUTIONS CONTAINING THE SAME

Filed July 14, 1965

INVENTORS
HENRY J. BACH
NAAMAN F. BARR
MILAN J. GETTING
JACK S. SKINNER

United States Patent Office 3,390,118
Patented June 25, 1968

3,390,118
RESINOUS COPOLYESTERS COMPRISING ALIPHATIC DIOL, POLYHYDRIC ALCOHOL AND DICARBOXYLIC ACID DIIMIDE AND COATING SOLUTIONS CONTAINING THE SAME
Henry J. Bach, Mount Lebanon, Naaman F. Barr, Pine Township, Allegheny County, Milan J. Getting, Ben Avon, and Jack S. Skinner, Pittsburgh, Pa., assignors, by mesne assignments, to Mobil Oil Corporation, a corporation of New York
Filed July 14, 1965, Ser. No. 471,802
7 Claims. (Cl. 260—33.4)

ABSTRACT OF THE DISCLOSURE

Organic solvent-soluble non-linear thermosetting copolyesters useful for the provision of high temperature resistant wire enamels are provided based on dicarboxylic acid diimides in place of the conventionally used terephthalic acid. The copolyester includes the dicarboxylic acid diimide as well as aliphatic diol and polyhydric alcohol. The preferred polyhydric alcohol is tris hydroxyalkyl isocyanurate. The copolyester is formulated into wire enamels in which the copolyester is desirably cured with alkyl phenol-modified aminoplast resin and titanium catalyst. These enamels can be used as basecoats or topcoats.

Figure 1:
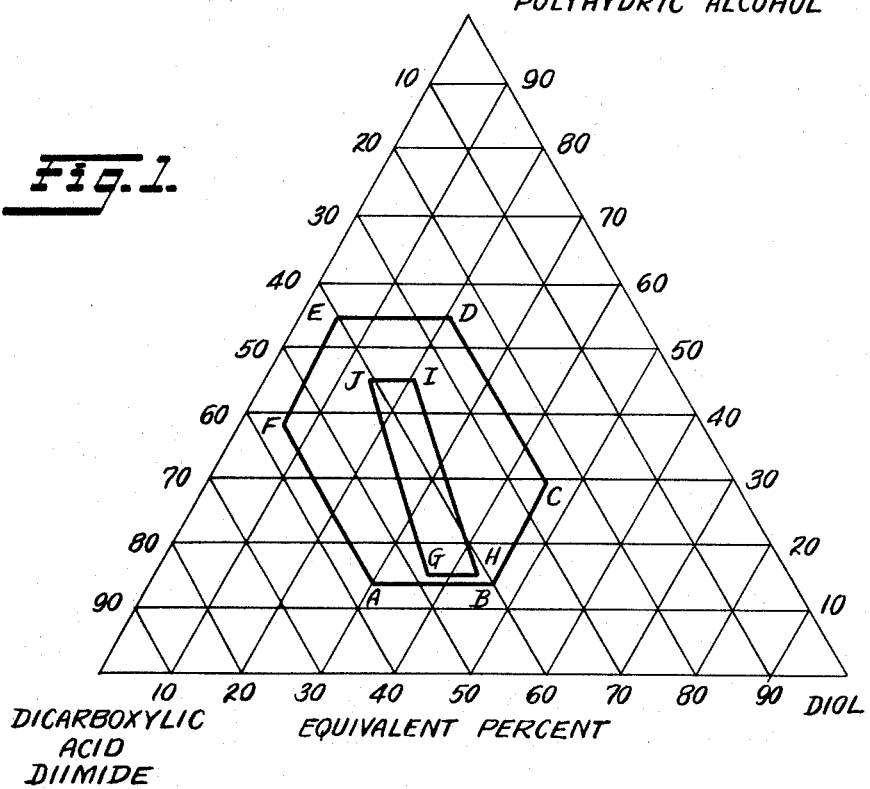

The present invention relates to copolyester resins particularly adapted for the formulation of wire enamels distinguished by their capacity to resist high temperatures and to organic solvent solution wire enamels containing the same. These copolyesters are provided by the polyesterification reaction of a dihydric alcohol, a polyhydric alcohol containing at least three hydroxyl groups and a dicarboxylic acid diimide. In the invention, the dicarboxylic acid diimide enhances the high temperature resistant properties of the copolyester in comparison with those obtained using other dicarboxylic acids, such as terephthalic acid.

Referring first to the copolyesters which are used in the invention, these copolyesters contain three essential components. The first component is the dicarboxylic acid diimide, a term intended to broadly denote two slightly different reaction products as will be detailed hereinafter as well as their corresponding esters and diesters, though the use of the acid is preferred.

The second essential component of the copolyester is aliphatic diol containing from 2-10 carbon atoms. Various aliphatic hydrocarbon diols may be used, including cyclo-aliphatic diols, the preferred diol being ethylene glycol. 1,4-butane diol; 1,5-pentanediol; and 1,4-butene-2-diol illustrate other preferred diols for use alone or together with ethylene glycol. Other diols which may be used are illustrated by 1,2-propanediol; 1,3-propanediol; 1,6-hexanediol; 1,3-cyclobutane diol; 1,4-cyclohexane diol; 1,4-cyclohexane dimethanol, etc. The preferred diols are straight chain diols having from 2-5 carbon atoms and two primary hydroxy groups.

The third essential component of the copolyester is a polyhydric alcohol having at least three hydroxyl groups, such as glycerin; pentaerythritol; 1,1,1-trimethylolethane; 1,1,1-trimethylolpropane; sorbitol; mannitol; dipentaerythritol; diglycerol, etc.

To emphasize the heat resistance of the polyester, it is preferred to employ as the polyhydric alcohol component, a tris-hydroxyalkyl isocyanurate which may be represented graphically by the formula:

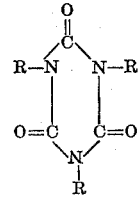

in which R represents an hydroxy alkyl radical containing at least two carbon atoms (i.e. 2-hydroxyethyl

—CH$_2$CH$_2$OH)

preferably two to four carbon atoms. The preferred isocyanurate is tris-2-hydroxyethyl isocyanurate. The isocyanurates and their production are more fully described in United States Patent No. 3,088,948, dated May 7, 1963, the disclosure of which is hereby incorporated by reference.

The utilization of tris-hydroxyalkyl isocyanurates in heat-resistant copolyesters including appropriate proportions of aromatic dicarboxylic acid and aliphatic diol containing from 2-10 carbon atoms is taught in the commonly owned copending application of Gerald P. Roeser, Serial No. 313,934 filed October 4, 1963, the disclosure of which is hereby incorporated by reference.

The copolyesters of the invention consist essentially of the three components identified hereinbefore and the proportions of these components are critically interrelated. From the broad standpoint, the copolyesters consist essentially of:

(A) from 25–56 equivalent percent, preferably 35–49 percent of the defined dicarboxylic acid diimides or their esters;

(B) from 6–46 equivalent percent, preferably 13–43 percent of the defined aliphatic diols; and (C) from 13–54 equivalent percent, preferably 15–45 percent of polyhydric alcohol, preferably trihydric alcohol.

The above broad indication of proportions is not adequate to identify the components which are used in the invention and the only feasible way of accurately defining proportions is graphically. This technique has been adopted in the triangulation presented herewith in which the effective proportions in accordance with the invention are defined as falling within the closed area A–B–C–D–E–F–A and the preferred proportions as falling within the closed area G–H–I–J–G.

The term "equivalent percent" designates the percentage computed for each reactant in accordance with the formula:

Equivalent percent of reactant=
$$\frac{100 \times \text{equivalents of reactants}}{\text{total equivalents}}$$

in which the number of equivalents of any reactant is normally determined by the number of moles of the reactant multiplied by the number of functional groups present in the reactant, (e.g., two for the dicarboxylic acid diimide and two for ethylene glycol).

As previously indicated, the dicarboxylic acid diimides used in the invention are of two types, e.g., one produced by reaction of two moles of a tricarboxylic acid in the acid or anhydride form with one mole of a diamine, and another produced by reaction of two moles of a monoamino carboxylic acid with one mole of a tetracarboxylic acid in the acid or anhydride form.

It should be understood that only primary amine groups are contemplated and that, when the tricarboxylic acid is not a monoanhydride, two of the carboxylic acid groups must be capable of anhydride formation, and when the tetracarboxylic acid is not a dianhydride, that the carboxylic acid groups must be capable of forming a pair of anhydride groups. The foregoing is clearly essential because imide formation is necessary and this requires a primary amine and either an anhydride group or a pair of carboxylic groups capable of forming an anhydride group.

Referring first to the reaction of two moles of tricarboxylic acid with one mole of diamine, this reaction is illustrated by the reaction of two moles of trimellitic anhydride and one mole of methylene dianiline to yield the following dicarboxylic acid diimide:

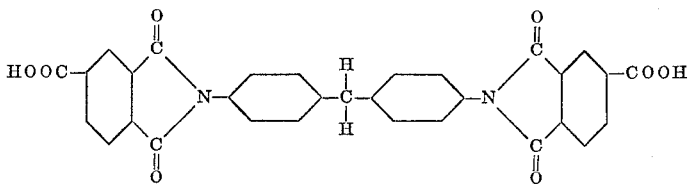

As can be seen from the structural formula, one mole of water must be eliminated for each mole of trimellitic anhydride used to provide the imide structure shown. If trimellitic acid were used in place of the anhydride, the same reaction would take place, but two moles of water would have to be eliminated for each mole of acid used.

While any diprimary amine may be used (the compound self-evidently cannot include any other functional group reactive with amine or carboxyl functionality), aromatic diamines and especially diaromatic diamines such as the methylene dianiline noted before are preferred. Other aromatic diamines are illustrated by para-phenylene diamine. Aliphatic diamines such as 1,2-diamino ethane are also useful.

At least tricarboxylic aromatic acids must be used in which two of the carboxylic acid groups are capable of forming an anhydride and, hence, capable of forming an imide. If the acid is higher than trifunctional, its functionality can be reduced to the desired trifunctionality by esterification with a monohydride alcohol or by amidization with a secondary amine.

The dicarboxylic acid diimides needed in the invention can also be formed by reacting aromatic dianhydrides or the corresponding tetracarboxylic acid, with a mono amino monocarboxylic acid in a mole ratio of substantially 1:2. A preferred tetracarboxylic acid is benzophenone tetracarboxylic acid preferably employed as the dianhydride. The mono amino acids which are preferred are those which have a carboxyl group on one end and an amine group on the other end. Typical examples are glycine (amino acetic acid) or as aromatic acids amino benzoic acid or amino salicylic acid.

The molar proportions noted should be observed within ±10%, preferably ±5%. While it is possible to isolate the dicarboxylic acid diimide prior to use, it is preferred to produce the diimide and then add the remaining components of the copolyester to the diimide reaction product without first modifying the reaction product in any way.

The copolyester may be formed either by direct esterification or by transesterification, depending upon whether the dicarboxylic acid diimide starting material is present in the acid or ester form.

When the isocyanurate-containing copolyesters are prepared from dimethyl esters of dicarboxylic acids, the copolyesters are terminated with ester groups, e.g., methyl groups. It would appear that these methyl groups are stripped off upon high temperature exposure, providing an opening for thermal decomposition to proceed. Accordingly, the copolyesters of the invention are preferably produced by the direct esterification of the dicarboxylic diimide.

The direct esterification of tris-hydroxyalkyl isocyanurate to provide preferred copolyesters is no simple matter as pointed out in said application Serial No. 313,934. Thus, and in the copolyesterification of diol (e.g., ethylene glycol), tris-hydroxyalkyl isocyanurate and dicarboxylic diimide, direct esterification has been found to be possible if the proportion of diol to trihydric isocyanurate is controlled and if the hydroxyl/carboxyl ratio (OH/COOH)

is properly adjusted for the specific diol/triol ratio which is selected.

At any diol/triol proportion, if the OH/COOH ratio is too high, the resin fails to advance adequately in molecular weight, resulting in poor application and inferior physical and electrical properties. Similarly, if the

Figure 2:
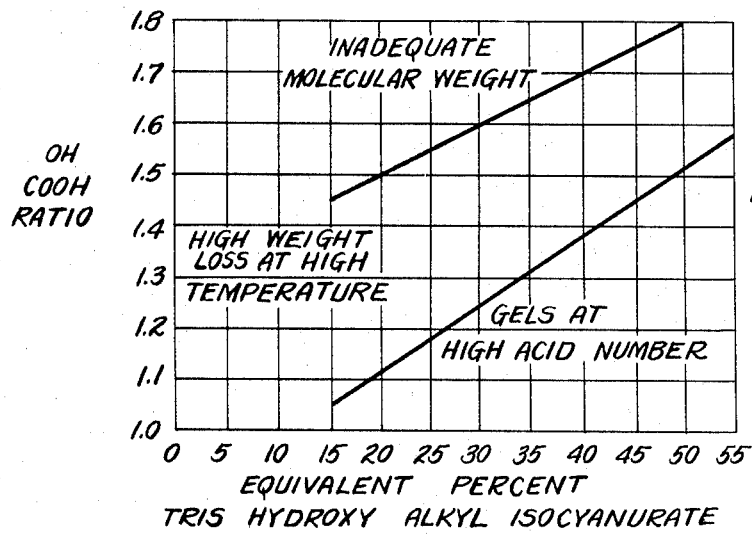

OH/COOH ratio is too low, the resin gels unpredictably and before the acid number of the product is adequately lowered. The OH/COOH ratios which may be used are shown in FIG. 2.

The copolyesters found to be useful in accordance with the invention have a specific viscosity (relative viscosity minus 1.0) measured at 77° F. in a 1 gram deciliter solution in a solvent mixture containing 60 parts of phenol to 40 parts of tetrachlorethane in the range of from about 0.10–0.70. It has been been found that from the standpoint of overall properties, it is preferred to employ copolyesters having a specific viscosity as indicated hereinbefore in the range of from 0.15–0.30.

Relative viscosity is determined in an Ostwald-Fenske viscosimeter and is computed as follows:

Relative viscosity=
$$\frac{\text{solution efflux time}}{\text{solvent efflux time}}$$

The relative viscosity is thus obtained by direct measurement. Specific viscosity may be derived by subtracting 1.0 from the relative viscosity.

The preferred copolyesters are desirably produced by a single stage reaction conducted in the presence of effective esterification catalysts at temperatures in the range of from 200 up to about 230° C.

When tris-hydroxyalkyl isocyanurates are used, the high temperature catalyzed reaction is essential for, otherwise, the reaction mixture must be maintained at a temperature in excess of the decomposition temperature of the isocyanurates for an excessive length of time. It is preferred, in accordance with the invention, to obtain yields which are approximately stoichiometric within a period up to about 8 hours, preferably 4–6 hours. If the reaction does not proceed this quickly, then the extent of decomposition and inter-molecular cross-linking which takes place is excessive, or resin production must be stopped at an inadequate yield or before the reaction has proceeded to provide a sufficiently lowered acid number.

In accordance with the invention, the acid number should be lowered below about 30, preferably below 20.

In the presence of an effective esterification catalyst, illustrated by 0.25% by weight of total reactants of antimony trioxide, a reaction temperature in the range of 220–230° C. is preferred for periods of time up to about 7 hours.

It is also important, when tris-hydroxyalkyl isocyanurates are used, to employ appropriate ratios of diol to triol in the copolyester and this will vary with the weight percent of tris-hydroxyalkyl isocyanurate in the copolyester which may range from 15 to 55 equivalent percent as shown in FIG. 2.

The copolyester product is desirably provided in the form of a solvent solution, preferred solvents being alkylated phenols which are desirably used in the form of liquid mixtures. Various commercial mixtures are known to the art under the generic term of cresylic acid.

The production of a preferred copolyester is as follows:

Example 1

To a 3-liter, 3-neck resin flask equipped with an agitator in the center neck, a reflux column attached to one side neck and a charging flask attached to the other side neck and a heat source installed below the flask are charged 6 moles trimellitic anhydride (1152 grams), 3 moles methylene dianiline (594 grams), and 1638 grams N-methyl pyrrolidone solvent. While under agitation, heat to reflux (310–360° F.) and remove 6 moles of water (108 grams). At this point, vacuum stripping of the solvent is started and the temperature is gradually increased to 400° F. A total of 86% of the solvent is removed under these conditions with the temperature gradually falling to 300° F. and the reaction mass becoming first a slurry and finally a solid. After removal of the 86% of the solvent (1410 grams), 1.8 moles of ethylene glycol (111.6 grams), 1.5 moles tris-hydroxyethyl isocyanurate (391.5 grams) and 5.1 grams antimony oxide (1% of the glycol+isocyanurate charge) are added to the reaction flask and heating started again. The reaction is continued at 430° F. until 6 moles of water (108 grams) are removed and an acid number of <20 is obtained. Any solvent which comes off with the water of esterification is returned to the reactor or made up with an equivalent amount of fresh solvent. In this experiment 70 grams of solvent had to be added. After the desired acid number is obtained, 1200 grams of cresylic acid (note 1) are added and the batch cooled. The resin solution is then discharged and adjusted to 31.7% solids using a 2/1 blend of cresylic acid/aromatic hydrocarbon solvent (boiling range 306–343° F.). The physical constants of the resin are:

| | |
|---|---|
| Specific viscosity (note 2) | 0.22 |
| Acid number | 19.3 |
| Hydroxy value | 67.7 |
| Total solids, percent | 31.7 |
| Viscosity, cp. | [1] 548 |

[1] At 86° F. using Brookfield with #3 spindle at 60 r.p.m.

Note 1.—Solvent composition of:

| | (Weight percent) |
|---|---|
| Phenol | 44 |
| o-Cresol | 14 |
| m-Cresol | 13 |
| p-Cresol | 5 |
| Mixed xylenols | 24 |

Note 2.—A sample is dissolved in 60/40 phenol/tetrachlorethane at a concentration of 1 gram per deciliter and the specific viscosity determined at 77° F.

It should be noted that properties other than mere resistance to elevated temperature are of importance to coated wire and it is desirable to maximize these properties, particular reference being had to the physical toughness of the coating which reveals itself in the capacity of the coating to withstand such stresses as are imposed by scraping, twisting and slitting. The capacity to resist heat shock and solvent shock are also of importance.

In the present invention, coating formulations are provided in which the copolyesters described hereinbefore are combined with alkyl phenolic-modified, organic solvent-soluble, heat-hardening aminoplast resin and the curing capacity of the mixture is enhanced by the presence of dissolved titanium ion, preferably in the form of a titanium cresylate. These, in the invention, cure uniquely to provide high temperature-resistant coatings of enhanced toughness.

The organic solvent-soluble, heat-hardening aminoplast resins which are used in accordance with the present invention form a well known class of resinous materials which are formed by the reaction of a polyamide and particularly a triazine, notably melamine, with excess aldehyde, especially formaldehyde, and the presence of an alcoholic solvent to provide organic solvent solubility, normally through at least partial etherification of the alkylol (methylol) groups of the resin by the alcohol solvent. Other polyamines are illustrated by urea, benzoguanamine and various triazines including dicyandiamide. Normally, the solvents contain at least 3 carbon atoms, butanol, ethoxy ethanol and 2-butoxy ethanol being particularly common. The reaction may be conducted in acid, essentially neutral or in alkaline medium, as is well known.

The solvent-soluble, heat-hardening aminoplast resin is desirably modified by cooking the same with an alkyl phenol or mixture of alkyl phenols. Appropriate alkyl phenols are the various isomeric cresols, especially mixtures thereof and also the various isomeric xylenols and their mixtures with one another and with the various cresols. While cresols and xylenols are particularly preferred, other alkyl phenols may be used or may be present in admixture with the cresols and xylenols which are preferred. Halogen-substituted alkyl phenols may also be present, especially in minor amount (up to about 15% by weight of the total weight of alkyl phenol). While reliance is had upon the use of alkyl phenols, halogen-substituted phenols such as orthochloro phenol may be present, especially if the proportion thereof is kept small to minimize the corrosive influence of the chlorophenols. The preferred alkyl groups are $C_1$–$C_4$ alkyl groups, especially methyl groups. The alkyl phenol-modified aminoplast resin should be used in an amount of about 2–25% of the weight of the polyester, preferably from 4–12% by weight, said weight percentages being based on non-volatile aminoplast resin solids prior to modification.

All that is required for the modification of the aminoplast resin with the alkyl phenol is that the two be cooked together thoroughly which causes a reaction to take place therebetween. The fact of reaction is easily noted by a reduction in the nitrogen content of the resin solids. A marked increase in the hydroxyl number of the product has also been noted as a result of the alkyl phenol cook. Cooking is facilitated by removing the lower boiling alcohols, such as butanol, with which aminoplast resins are normally associated, but this is not essential. The removal of butanol also improves the flow of the coating solution.

In view of the use of alkyl phenol-modified aminoplast resins, the coating solutions made therefrom will naturally include an alkyl phenol component as an important part of the solvent system of the coating solution and, preferably, as a major weight component of the solvent phase thereof.

Dissolved titanium ion is desirably present as catalyst. Other metal ions such as aluminum, zinc and magnesium also exert a catalytic curing activity but these do not provide the uniquely superior properties which are provided by the titanium ion.

To maximize compatibility of the various components in the system, the dissolved titanium ion is preferably provided in the form of a titanium complex with the previously described alkyl phenols. Thus, the organic derivative of titanium with a mixture of cresols can be identified as a titanium cresylate. While titanium cresylates are preferred, they are not essential and other organic derivatives of titanium providing titanium ion in a form permitting its dissolution, such as tetrabutyl titanate, may be used.

The titanium catalyst is desirably present in an amount (based on titanium metal) of at least about 0.1% of the weight of the polyester to be cured, though it is preferred to employ proportions of at least about 0.2% up to about 1.5% of the catalyst. Particularly preferred proportions are from 0.3 to 0.8%. It is also preferred to interrelate the proportion of titanium catalyst with the proportion of aminoplast resin, a preferred weight ratio of aminoplast resin to titanium catalyst being from 20:1 to 3:1, from 15:1 to 5:1 being viewed as optimum. Again, the titanium content is based on the weight of metal and the aminoplast resin is measured by the weight of non-volatile resin solids prior to modification.

*Example II.—Formation of titanium cresylate*

To a stainless steel kettle equipped with an agitator, a reflux condenser and a heating and cooling source, charge 60 pounds of a 50/50 phenol/o-cresol mixture, 20 pounds of tetrabutyl titanate and 20 pounds of an aromatic hydrocarbon solvent having a boiling range of 145–195° C. While agitating, heat to reflux (300–315° F.) within four hours and hold at reflux for thirty minutes. Cool to room temperature (80–90° F.) as quickly as possible—in less than one hour.

The intermediate thus prepared should be stored in air-tight containers at temperatures above 60° F. and should be used within two months of manufacture.

*Example III.—Modification of aminoplast resin with alkyl phenol*

To a stainless steel kettle equipped with an agitator, a heating and cooling source, a distillate condenser-receiver and a source of vacuum, charge 85 pounds of a cresylic acid and 15 pounds of a 66.7% solids solution of butylated heat-hardening melamine-formaldehyde resin. While agitating, heat to 273° F. and hold for five minutes at atmospheric pressure. While continuing to maintain the same heat input apply a vacuum to remove 25 pounds of solvent including any butanol introduced by the resin solution charged. This distillate is discarded and the remainder of the charge is cooled to room temperature and transferred to suitable containers for storage.

The cresylic acid referred to in this example contains the following components:

| Cresylic acid analysis: | Percent by weight |
| --- | --- |
| Phenol | 10.1 |
| Ortho-cresol | 12.9 |
| 2,6-xylenol | 0.3 |
| Meta-para cresol | 27.9 |
| Ortho-ethyl phenol | 1.1 |
| 2,4–2,5-xylenol | 15.9 |
| 2,3-xylenol | 19.6 |
| 3,4-xylenol | 7.0 |
| Alkyl-substituted phenols containing 9 carbon atoms | 5.2 |

The melamine-formaldehyde resin used in this example is made as follows:

521 grams of a 40% solution of formaldehyde in isobutanol (contains about 7% of water) are charged to a two liter flask together with 72 grams of water and the mixture is adjusted to a pH of from 6.8–7.4 with sodium hydroxide. 187 grams of melamine and 293 grams of n-butanol are added and the mixture is heated to 70–80° C. in 20 minutes and is held at this temperature for 25 minutes. The temperature is then raised to about 99° C. at which point distillation occurs and the mixture is refluxed, the water being collected and the butanol being returned to the flask. After distilling for an hour and 20 minutes, 1 gram of 50% formic acid and 11 grams of n-butanol are added slowly over a 1 hour period and the distillation is continued for a total distilling time of 3½ hours. Vacuum is then applied and approximately 209 grams of butanol are removed by the vacuum application. At this point, the vacuum is removed and the product is thinned by the addition of approximately 96 grams of xylol to provide a solution product having a non-volatile resin solids content of 66.7%.

Other aminoplast resins have successfully been used in place of the melamine-formaldehyde resin referred to above. Thus, there are many commercial organic solvent-soluble, heat-hardening melamine-formaldehyde resins and several of these were tested and found to be operable. Similarly, a commercial butylated triazine formaldehyde resin was used successfully, though the melamine resins are preferred. Butylated ureaformaldehyde resins were also checked and found to be useful.

It is of possible significance to note that a great degree of resinification is not necessary since commercial monomeric hexamethoxy hexamethylol melamine is useful.

*Example IV*

The coating systems of the invention are illustrated by cold blending the following:

| | Parts by weight |
| --- | --- |
| Polyester resin solution of Example I | 85.4 |
| Cresylic acid used in Example III | 2.3 |
| Aromatic hydrocarbon solvent (boiling range 145–195° C.) | 1.1 |
| Modified aminoplast resin of Example III | 5.5 |
| Titanium cresylate of Example II | 5.7 |

The last item is added slowly to the mixture of other items under agitation.

The coating solutions of the invention are desirably applied to aluminum or copper wire or foil and baked as indicated hereinafter to provide heat-resistant coatings which are physically tough as evidenced by their capacity to resist flexure, abrasion, slitting, twisting and the like as well as their ability to resist heat shock and solvent shock. While it is permissible to overcoat the coatings of the invention with a top coat material such as an essentially linear, cold-drawable, high molecular weight polyethylene terephthalate such as "Mylar," the capacity to resist heat shock provided by the coatings of the invention reduces the need for such "Mylar" top coatings. Indeed, the coating solutions of the invention are not only useful as a base coat, but they are also well adapted to serve as a top coat over copolyester base coats such as those disclosed in commonly owned copending application Ser. No. 417,744, filed Dec. 11, 1964, the disclosure of which is incorporated by reference. When used as a top coat, the coating solutions of the invention exhibit improved flexibility, resistance to heat shock and cut through resistance.

The wire enamels of the invention are applied to wire in a plurality of separate coatings, each approximately ½-mil in thickness with each coating being baked prior to the application of the succeeding coating. Appropriate baking equipment for the wire is illustrated by a vertical tower having a 12-foot heating zone in an overall length of 15 feet. The temperatures within the oven range from 250° F. at the bottom to 800° F. at the top of the heating zone. The wire is moved through the tower at speeds of from 15–25 feet per minute.

To illustrate utilization of the coating solutions of the invention as a base coat, five coatings are applied successively to No. 18 AWG copper wire to provide a total coating build of 2½ mils which is then overcoated with a final coating of "Mylar" increasing the total coating build to 3 mils.

To illustrate utilization of the coating solutions of the invention as a top coat, five coatings are applied, successively, of a base coat solution produced as described in said application Ser. No. 417,744, and containing 100 parts by weight of the polyester resin of Example I of said application combined with the titanium catalyst solution of Example II of said application in an amount providing .6 part by weight of titanium metal and alkyl phenol modified aminoplast resin solution of Example III of said application in an amount to provide 18.8 parts of melamine resin prior to modification. There is thus provided an enameled wire having a total coating build of 2½ mils and the coating solution of the present invention is applied as a topcoat to increase the total coating build to 3 mils. In each instance, the coatings are baked as noted hereinbefore prior to the application of the succeeding coating.

The invention is defined in the claims which follow.

We claim:

1. A coating solution comprising organic solvent including $C_1$–$C_4$ alkyl-substituted phenol having dissolved therein:
    (1) a thermally convertible copolyester possessing improved elevated temperature exposure resistance and consisting essentially of the copolyesterification reaction product of:
        (A) dicarboxylic acid diimide selected from the group consisting of those produced by reaction of two moles of a tricarboxylic acid in which two of the carboxylic acid groups are capable of anhydride formation or the anhydride thereof with one mole of a diprimary amine, and those produced by reaction of two moles of a monoamino carboxylic acid with one mole of a tetracarboxylic acid in which the carboxylic acid groups are capable of forming a pair of anhydride groups or the anhydride thereof;
        (B) aliphatic diol containing from 2–10 carbon atoms and comprising ethylene glycol; and
        (C) tris-hydroxyethyl isocyanurate,
    the equivalent proportions of said components (A), (B), and (C) being defined by the closed area G–H–I–J–G in the accompanying triangulation, said copolyester having a specific viscosity in the range of from 0.15 to 0.30, viscosity being measured at 77° F. in a 1 gram per deciliter solution in a solvent mixture of 60 parts of phenol to 40 parts of tetrachlorethane, said reaction product having an acid number of less than 30,
    (2) $C_1$–$C_4$ alkyl-substituted phenol-modified, organic solvent-soluble, heat-hardening aminoplast resin in in an amount, based on unmodified aminoplast resin solids, of about 2–25% of the weight of said reaction product; and
    (3) titanium ion as catalyst in an amount, based on titanium metal, of from 0.2% to 1.5% of the weight of said reaction product, the weight ratio of said aminoplast resin to said titanium catalyst being from 20:1 to 3:1.

2. The coating solution of claim 1 in which said aminoplast resin is modified by cooking the same with said alkyl phenol.

3. The coating solution of claim 1 in which said aminoplast resin is a melamine-formaldehyde condensate.

4. The coating solution of claim 1 in which said titanium ion is supplied by a titanium cresylate.

5. A metal substrate coated with a baked film of the coating solution of claim 1.

6. Copper wire coated with a baked film of the coating solution of claim 1.

7. Enameled wire topcoated with a baked film of the coating solution of claim 1.

References Cited

UNITED STATES PATENTS

| | | | |
|---|---|---|---|
| 3,297,785 | 1/1967 | George et al. | 260—850 |
| 3,342,780 | 9/1967 | Meyer | 260—75 |

MORRIS LIEBMAN, *Primary Examiner.*

L. T. JACOBS, *Assistant Examiner.*